J. H. KLENCK.
CAMERA SHUTTER.
APPLICATION FILED APR. 23, 1918.
1,329,714.
Patented Feb. 3, 1920.
3 SHEETS—SHEET 1.
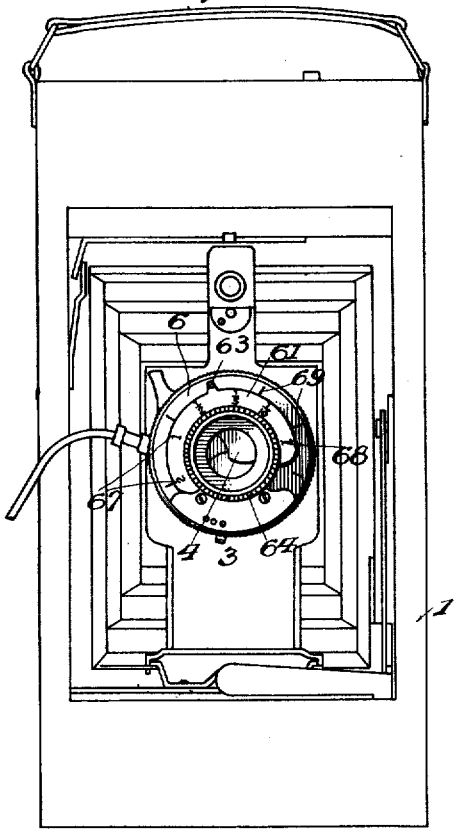
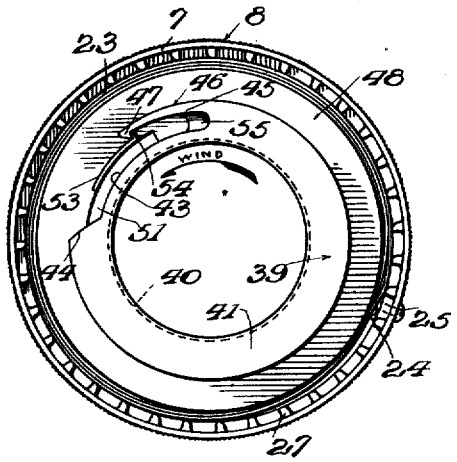
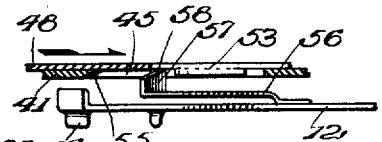
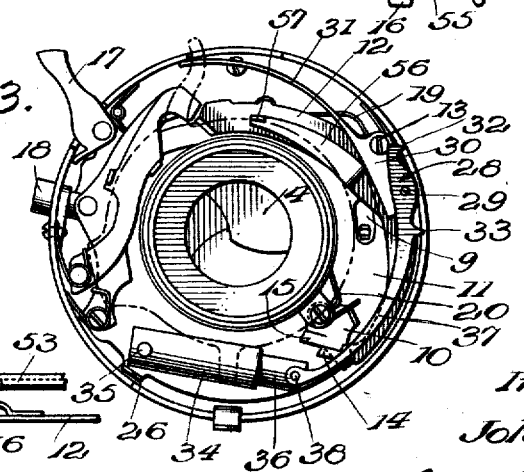
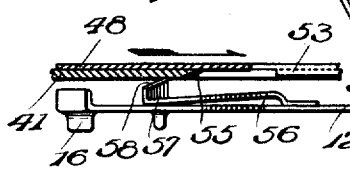
Inventor.
John H. Klenck
By Lacey & Lacey
Attys.

J. H. KLENCK.
CAMERA SHUTTER.
APPLICATION FILED APR. 23, 1918.
1,329,714.
Patented Feb. 3, 1920.
3 SHEETS—SHEET 2.
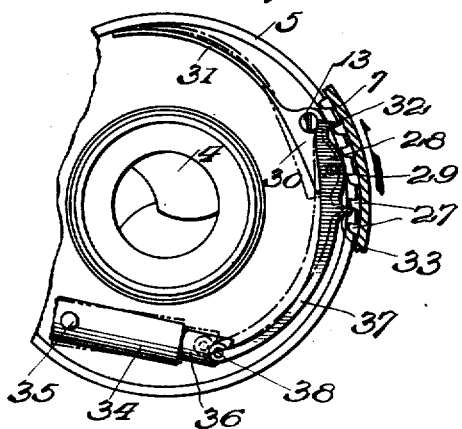
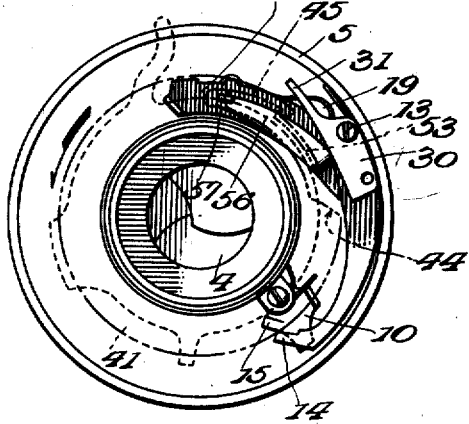
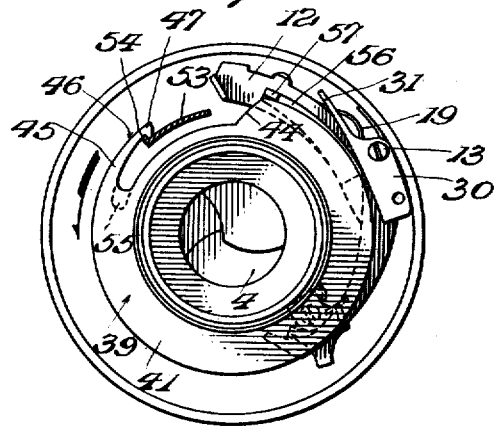
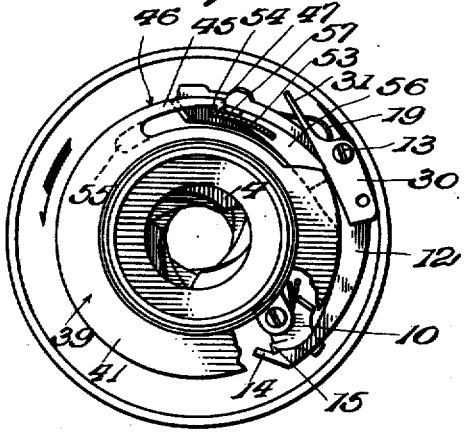
Inventor:
John H. Klenck.
By Lacey & Lacey,
Attys.

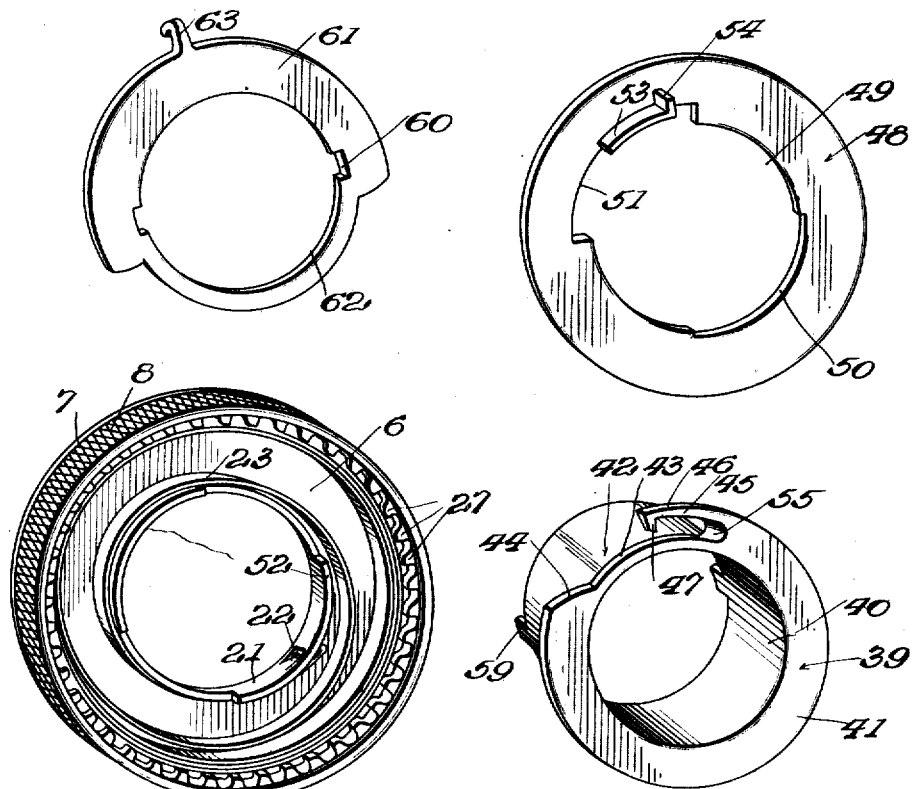
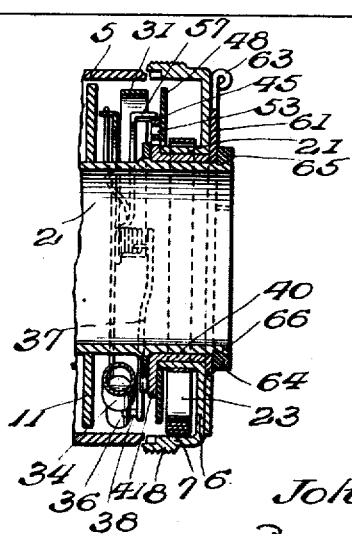
Fig. 10.
Fig. 11.
Inventor.
John H. Klenck.
By Lacey & Lacey,
Attys.

UNITED STATES PATENT OFFICE.

JOHN H. KLENCK, OF WARREN, PENNSYLVANIA.

CAMERA-SHUTTER.

1,329,714.     Specification of Letters Patent.     Patented Feb. 3, 1920.

Application filed April 23, 1918. Serial No. 230,340.

*To all whom it may concern:*

Be it known that I, JOHN H. KLENCK, a citizen of the United States, residing at Warren, in the county of Warren and State of Pennsylvania, have invented certain new and useful Improvements in Camera-Shutters, of which the following is a specification.

This invention relates to improvements in camera shutters. A disadvantage attending the use of a camera equipped with the ordinary shutter lies in the fact that the shutter is required to be operated from a position in the immediate vicinity of the camera so that the person manipulating the camera cannot be included in a group to be photographed unless indeed some ingenious device is provided for the attainment of such a result as, for example a string released trigger device adapted to strike the finger release of the shutter when the string is pulled upon after the party has taken his position in the group. Even where it is possible to employ some such crude means to permit of the operator of the camera photographing himself either alone or in a group, the best results cannot always be obtained as the crudeness of the means employed precludes the making of timed exposures; in other words, the shutter mechanism must be set for what is known as a snapshot exposure. It is true that various attachments have been previously devised for employment by attachment to some portion of the camera in position where they may act against the finger release of the shutter mechanism, but such devices are impracticable for many reasons. If they are for use upon a camera of the folding type they are so cumbersome as to preclude folding of the camera while the attachment is in place or they are so constructed as to prevent their use with a camera having a tilting or vertically adjustable front. Furthermore, such attachments are ordinarily of considerable weight; they detract from the otherwise neat and compact appearance of the camera; they are adapted solely to coact with the finger release of the camera shutter and can, therefore, be only employed when the shutter is adjusted for instantaneous exposure; and, they are expensive to manufacture. As a consequence the length of the exposure period, in the use of such an attachment, must lie between the limits defining the possible high and low speeds of the shutter when the shutter mechanism is set for instantaneous exposure. Thus if, due to light conditions, it is essential that the shutter be open for a longer period of time than the period of greatest length for which the shutter is adapted to remain open when the actuating mechanism for the shutter is set for instantaneous exposure, such an attachment cannot be successfully employed. In consideration of the foregoing it is one of the primary objects of the present invention to provide, not an attachment, in the strict sense of the word, for a camera shutter mechanism, but an improved shutter actuating mechanism housed completely within the casing for the shutter and therefore inconspicuous, and which mechanism may be set for actuation, and will automatically open the shutter a predetermined length of time after it has been set and released, thus permitting the operator of the camera to take his position in front of the camera either by himself or in a group to be photographed. A further object of the invention is to so construct the shutter actuating mechanism that the same may be accurately set to cause opening of the shutter for any desired predetermined length of time so that the person making use of the camera, having determined beforehand the length of exposure required, may set the mechanism and will be certain that the camera shutter will remain open the required length of time even though the period of exposure may be of greater length than the longest possible period provided for through adjustment of the shutter mechanism should the shutter be set for instantaneous exposure.

Various types of shutters now upon the market embody various means whereby the length of the exposure period may be increased or diminished when the shutter mechanism is set for what is known as instantaneous exposure and the speeds range ordinarily from the highest speed to a speed of ordinarily one twenty-fifth of a second. If, in the use of such a shutter, it is desired to make an exposure of one tenth of a second or a fifth of a second, or even for example, one or two seconds, the shutter mechanism must be set for what is known as bulb exposure or time exposure and the operator must depend upon his correct judgment of time in determining when to close the shutter either through actuation of the finger release or the bulb release, and the fact can be readily appreciated that even one highly skilled in such work is liable to error. It is true that shutter mechanisms have been previously devised in which the closing of the shutter is retarded through the medium of a cylinder and piston, but while it is claimed that such devices are accurate in the performance of their functions, nevertheless it has been found by actual experience that after a relatively short period of use some of them will in their operation be in error as much as two-hundred percent. It is, therefore, a further and important object of the present invention to provide camera shutter mechanism which may be set for automatic actuation of the shutter at the highest possible speed, at a low speed of one or several seconds, and at any desired intermediate rate of speed, the mechanism being constructed upon such principles that error is practically impossible.

Another object of the invention is to so construct and arrange the parts of the shutter mechanism that all parts thereof will be completely housed within the casing for the shutter, which casing need be no larger than the ordinary camera shutter casing. Thus the presence of the mechanism does not in any way detract from the appearance of the camera, does not appreciably increase the weight thereof, and does not in any way interfere with adjustment of the camera front, folding of the camera, or actuation of the shutter mechanism through manipulation of the finger release or the bulb release as in the instance of the ordinary shutter.

A further object of the invention is to provide for adjustment of the length of the exposure periods through the angular movement or adjustment of a member located upon the front of the shutter casing and bearing scale marks for independent registration with scale marks upon the said front of the shutter casing so that although the movement of the said member in making adjustments thereof is slight, the adjustments may be made with great accuracy and the scale numerals may be so spaced and of such size as to be readily discernible.

A further object of the invention is to so construct the mechanism that the shutter front will constitute the setting member of the mechanism, being rotatably mounted and spring actuated in such manner that when rotated in one direction and released its rotation under the influence of the spring, in the opposite direction, will be suitably retarded to allow sufficient time to elapse to permit of the person using the camera taking his position in front of the camera either alone or in a group, prior to opening of the shutter, which is automatically accomplished as the camera front approaches its normal position. Incidentally the invention has as its object to provide an escapement means for retarding the rotation of the shutter front after it has been released, which means is so constructed and mounted that it will be subjected to minimum strain and wear when the said shutter front is rotated in a direction to set the same, and even should it be very quickly and carelessly turned in setting.

A further object of the invention is to provide in connection with the escapement device, a retarding means including a cylinder or dash pot, and a piston operating therein in connection with the escapement lever, the cylinder and piston being so proportioned and so mounted, however, that errors in the timed length of exposures are not liable to occur through changes in temperature, dust, moisture, or other conditions affecting the free movement of the piston within the cylinder or dash pot.

In the accompanying drawings:

Figure 1 is a front elevation of a camera equipped with the improved mechanism embodying the present invention;

Fig. 2 is a view in rear elevation of the front for the shutter casing removed;

Fig. 3 is a front elevation of that portion of the mechanism embodying the present invention which is housed within the shutter casing, the front of the shutter casing being removed, however;

Fig. 4 is a detail view illustrating the relationship of the master lever, detent member, and trip member, the several parts being in their normal or initial positions;

Fig. 5 is a view similar to Fig. 4 but illustrating the positions of the trip member and detent member in the initial rotation of the setting member or shutter front, to set the mechanism for operation;

Fig. 6 is a detail front elevation of a portion of the mechanism and illustrating more particularly the escapement lever, the retarding means therefor, and, in section, a portion of the setting member;

Fig. 7 is a view in elevation of a portion of the mechanism, the said view illustrating in full lines the master lever in its normal position, the trip and detent members being shown in dot and dash lines in said normal position;

Fig. 8 is a view similar to Fig. 7 illustrating the master lever and trip member in elevation and a portion of the detent member in vertical transverse section, the latter members being in position immediately after the setting member has been set and then released, and the said master lever being in tripped position;

Fig. 9 is a view similar to Fig. 8 but illustrating the positions of the trip and detent members when the setting member has nearly completed its rotative movement under the influence of its actuating spring, the said view illustrating the master lever in position released to an extent to maintain the shutter in open position;

Fig. 10 is a group perspective view illustrating the setting member, trip member, detent member, and the member whereby the exposure period may be varied, disassembled;

Fig. 11 is a vertical longitudinal sectional view through the shutter casing and front, various elements comprising parts of the finger and bulb release devices and other devices non-essential to the present invention, being, however, omitted for the sake of clearness.

In the drawings the numeral 1 indicates in general a folding camera of the well-known type and the numeral 2 indicates the lens tube of the camera, this tube being mounted upon the camera front 3 in the usual manner. The shutter for the camera comprises the usual blades 4 and is, together with its actuating mechanism, mounted within the usual shutter casing indicated in general by the numeral 5, the said casing surrounding the lens tube in the manner clearly shown in Fig. 11 of the drawings. The numeral 6 indicates in general the front of the shutter casing 5 but as distinguished from the ordinary shutter casing front, the front in the instance of the present invention is rotatably mounted about the forward end portion of the lens tube 2 and with relation to the body of the said casing 5. In order to facilitate rotation of the shutter front 6, the said front is formed exteriorly upon its circumferential flange 7, with a circumferential knurled portion 8. The purpose of rotatably mounting the shutter front and the functions performed by this member aside from serving its purpose as a means for closing the front of the casing 5, will be presently specifically explained.

In the drawings many parts of the mechanism common to the ordinary finger and bulb release devices and parts comprising elements of the adjusting device for the iris diaphragm are omitted for the sake of clearness and only such old and well-known parts are illustrated as are necessary to an understanding of the improvements of the present invention. For example, it is well known in the art that the shutter blades 4 are actuated through the partial rotation, release, and spring actuation, of what is ordinarily termed the blade ring, a portion of this ring being discernible in Fig. 3 of the drawings and indicated by the numeral 9. This ring is to be actuated through a spring controlled blade ring lever indicated by the numeral 10 and pivotally mounted upon a fixed plate 11 located within the casing 5. The blade ring lever 10 is in turn actuated, as in the ordinary shutter, through the tripping and release of a master lever which is indicated in general by the numeral 12 and which is pivotally mounted between its ends upon a pin or pivot screw 13 fixed in the said plate 11, the said lever at its lower end being provided with a lug 14 which, in the tripping movement of the lever is designed to ride over and engage behind a lug or shoulder 15 upon the blade ring lever 10, and at its opposite or upper end being provided with the usual lug 16 for the coaction with the said master lever of the elements of the finger release and bulb release devices which as they do not enter into the present invention, need not be specifically described. However, to identify these devices, the numeral 17 indicates the finger lever of the finger release device and the numeral 18 indicates the nipple of the bulb release device. In ordinary shutter construction, as is well-known, when the elements of the finger release device or the bulb release device are actuated through depression of the finger lever 17 or pressure exerted upon the bulb of the latter device (not shown) the upper end of the master lever 12 is swung in an upward direction causing its lug carrying end 14 to ride over and engage behind the lug 15 upon the blade ring lever 10, and then when the said upper end of the master lever 12 is released, the lever is returned by a spring associated therewith, and indicated in the drawings by the numeral 19, to its normal position. In this latter movement of the master lever 12, the blade ring lever is first swung against the tension of its actuating spring 20, to so rotate the blade ring as to open the shutter blades, and then close the same and when the shutter mechanism is set for instantaneous exposure, the master lever 12 is immediately released after having been moved to tripped position so that the opening and closing of the shutter is, in a sense, instantaneous. However, if the shutter mechanism is set for time exposures, the master lever 12 is arrested in its return movement after having been tripped and released so that it will assume a position maintaining the shutter blades open. Then, of course, in the instance of the ordinary shutter, when the finger lever 17 is again depressed or the bulb is pressed a second time, the master lever is fully released and the shutter is immediately closed through the return movement of the blade ring lever 10 under the influence of its spring 20. It will, therefore, be understood at this point that if means is provided for first automatically tripping the lever 12, then releasing the same but arresting it in its movement to released position, the shutter will remain open until the said master lever 12 is fully released, whereupon the shutter will be closed and if the means provided for automatically tripping and releasing the said master lever is so constructed that it may be adjusted to act at any desired interval of time to fully release the master lever 12 after the lever has been partly released but arrested in its release movement, an accurately timed exposure may be automatically made without necessitating any dependency upon human judgment or skill in timing the said exposure. The provision of means for accomplishing the result above mentioned is the primary object of the present invention and the said means will now be specifically described.

The front 6 of the shutter casing is provided centrally with an opening surrounded by an inwardly projecting annular flange 21 located concentrically to the flange 7 of the said front 6. A portion of the flange 21 is struck outwardly as indicated by the numeral 22 to serve as an anchoring means for one end of the actuating spring for the said front 7, this spring being indicated in the drawings by the numeral 23 and being designed to be wound through rotation of the front 6 in one direction, and, when the front is released, being designed to automatically rotate the said front in the opposite direction. The other end of the spring 23 is formed with a hook 24 designed to engage against the inner end of an abutment screw 25 threaded through the flange 7, as clearly shown in Fig. 2 of the drawings. The engagement of the hooked end 24 of the spring 23 against the inner end of the screw 25 serves, of course, to maintain the spring normally under the proper degree of tension so that when this end of the spring is engaged by an element fixed with relation to the body of the casing 5, and the said front is rotated in one direction, in the present instance toward the right, the said spring 23 will be placed under further tension in order that when the front is released it may be sufficiently tensioned to positively rotate the said front in the opposite direction, or in other words, toward the left. This element is in the nature of a forwardly projecting finger 26 carried by the plate 11, the finger at its outer end projecting beside the inner side of the flange 7 and engaging, as stated, in the hook 24 at the end of the said spring. At this point it will be understood that the front 6 having been assembled with the forward end of the casing 5, the said front may be rotated so as to tension the spring in the manner above explained and upon return rotation of the said front under the influence of the tensioning spring, such motion of the front will be arrested at the proper point by engagement of the said finger 26 against the said inner end of the screw 25, the screw 25 serving, therefore, as a means for limiting the backward rotation of the shutter front after it has been set and released.

As the backward rotation of the shutter front under the influence of the spring 23 is designed to require a sufficient length of time to permit of the one setting the front, taking his position in front of the camera either alone or in a group to be photographed, it is, of course, essential that means be provided for retarding the rotation of the said front in the direction stated. It is also essential that the retarding means be of such nature and so constructed as to insure of steady and yet positive movement of the said front so that when the front has reached that point in its backward rotative movement at which the trip member carried by the front is designed to operate to trip the shutter and maintain the same open for the desired predetermined length of time, the movement of the said front will be sufficiently regular and steady to insure of accuracy in the operation of the means provided for opening and closing the shutter in making the required length of exposure. The retarding means includes an internal ratchet 27 comprising an annular series of ratchet teeth formed upon the inner side of the flange 7 of the front 6, and an escapement lever, indicated in general by the numeral 28, which lever is designed to coact with the ratchet in a manner which will be presently made apparent. The escapement lever 28 is a floating lever, or in other words, is mounted upon a pivot which is movable with relation to the flange of the shutter front as distinguished from a fixed pivot. The pivot pin is indicated by the numeral 29 and the same is carried by a head 30 mounted for rocking movement upon the pivot pin or screw 13 heretofore referred to. The pin 29 is located at one side of the pivot 13, and the head 30 at the other side of the said pivot is provided with a leaf spring 31 which at its free end bears against the inner side of the wall of the casing 5. The spring 31, it will be apparent by reference to Fig. 3, yieldably holds the head 30 swung in such manner that its pin carrying end will be yieldably held in the direction of the wall of the casing 5. It will be understood, however, that if pressure is exerted in an inward direction against the escapement lever 28, the lever may yield bodily in an inward direction as that end of the head 30 by which it is carried will at such time be moved inwardly against the tension of the spring 31. At opposite sides of its pivot 28, the escapement lever is provided with teeth 32 and 33 which teeth are designed to successively engage the teeth 27 of the internal ratchet carried by the shutter front in the well-known manner. Of course, when the front has been rotated toward the right in setting the mechanism for actuation and the said front is released, the successive engagement of the teeth 32 and 33 of the escapement lever with the teeth 27 of the internal ratchet will retard the speed of rotation of the shutter front to the desired degree, particularly in view of the provision of further means which will be shortly described. If the pivot 29 were fixed it will be realized that the winding up of the spring 23 through rotation of the shutter front would require an undesirable length of time, and if the shutter front were too quickly wound or rotated injury would probably be caused to the teeth 32 or 33 or the ratchet teeth 27. Due to the provision, however, of a floating pivot for the escapement lever, the said front may be rapidly rotated in a direction to set the same without fear of injury to the teeth of the ratchet and escapement lever or injury to a dash pot device which is provided in connection with the said lever. The retarding dash pot comprises a cylinder 34 which is pivotally mounted at its closed end as at 35 upon the plate 11, and a small piston 36 which is slidably fitted within the said cylinder 34. The escapement lever 28 is provided at that side of its pivot pin 29 at which the tooth 33 is located, with an extension or arm 37 pivotally connected as at 38 with the outer end of the piston 36 and it will be understood that as the escapement lever is oscillated upon its pivot 29 the piston 36 will be reciprocated in the cylinder 34 thus retarding the oscillatory motion of the escapement lever due, in the inward movement of the piston to the compression of air within the cylinder 34 and in the outward movement of the piston to the creation of a partial vacuum in the said cylinder. In the illustrated embodiment of the invention air is to leave the cylinder and enter the same around the sides of the piston 36, but, of course, either the cylinder 34 or piston 36 could be provided with a small vent opening or passage to permit of the more ready escape and entrance of air. By pivotally mounting the dash pot cylinder 34 the cylinder is capable of free angular movement to adapt itself not only to the oscillatory motion of the escapement lever 28 but also to any changes in position of this lever due to the floating movement of its pivot pin 29.

Having described the means provided for rotating the shutter front after the same has been rotated to set position and released, the means carried by the front and designed for coaction with the master lever 12 will now be described. The trip member heretofore referred to is indicated in general by the numeral 39 and the same comprises a cylindrical body 40 provided at one end with an outstanding circumferential flange 41. The body 40 is rotatably fitted within the flange 21 of the shutter front 6, as clearly shown in Fig. 11 of the drawings, and with the flange 41 abutting against the inner end or edge of the said flange 21. As above stated, the body 40 of the trip member is rotatably fitted within the opening defined by the flange 21 and this, as will be presently explained, provides for adjustment of the trip member to vary the length of the period of exposure. However, it will be readily understood that the trip member is in fact carried by the shutter front 6 and is bodily rotatable therewith. At a point in its circumference, the flange 41 is recessed or cut-away, as indicated by the numeral 42, and the inner wall of this recess is indicated by the numeral 43 and is located close to the exterior surface of the cylindrical body 40. One end wall of the recess 42, indicated by the numeral 44, is inclined upwardly or outwardly preferably along a curved line, and at the opposite end of the recess 42, the said recess extends circumferentially into the flange 41 so as to provide an overhanging finger 45, the outer edge 46 of which constitutes a continuation of the outer edge of the said flange 41. The end of the finger 45 is formed with an inwardly projecting stop shoulder 47 which is suitably spaced at its extremity from the wall 43 of the recess 42 and which serves a purpose to be presently explained. Not only is the body 40 of the trip member 39 rotatably adjustable within the opening defined by the flange 21 but it is also rotatably adjustable with relation to the detent member of the mechanism. The detent member above referred to is indicated in general by the numeral 48 and the said member is in the nature of a flat and relatively thin ring, the opening 49 in which is of a diameter to snugly receive the said body 40 of the trip member, except that the wall of the opening 49 is cut-away at diametrically opposite points, as indicated by the numerals 50 and 51 so as to form arcuate recesses which receive oppositely located extensions 52 of the flange 21 of the shutter front. In this manner when the parts are assembled, the ring comprising the detent member 48 is held fixed with relation to the shutter front and is rotatable therewith, the trip member being, however, as before stated, rotatably adjustable with relation to the said ring 48 and the said shutter front. Upon one face, the ring 48 is formed along the inner or arcuate wall of the recess 51, with an inwardly projecting arcuate flange or ledge 53 provided at one end with an outwardly projecting stop shoulder 54. When the parts are properly assembled, the finger 45 of the trip member will extend for a greater or less portion of its length, above the ledge 53, depending upon the adjustment of the trip member with relation to the said detent member, which adjustment is limited in one direction by abutment of the lug 47 against the lug 54, as shown in Fig. 2 of the drawings. In effect the ledge 53 constitutes a stepped continuation of the outer edge or periphery of the flange 41 of the trip member 39 and the purpose of thus constructing the parts will be presently pointed out. At this point it is to be noticed that the rearwardly or inwardly presented face of the flange 41 at that end of the recess overhung by the finger 45, is beveled or cut at an angle, as indicated by the numeral 55 so that when the parts are assembled the bevel 55 constitutes an inclined surface extending from the face of the ring comprising the detent member, to the said inwardly or rearwardly presented face of the flange 41.

The master lever 12 is provided with an integral or attached arm, whichever may be found preferable, indicated by the numeral 56 and extending from its attached end, normally substantially parallel to the side of the said lever, as clearly shown in Fig. 4 of the drawings. This arm, however, is resilient and is provided at its free extremity with an outstanding finger 57 having a beveled or inclined outer end or edge 58. The finger 57 is designed to coöperate with the trip and detent members in a manner to be pointed out in the description of operation of the mechanism, and before proceeding to such description, the means provided for adjusting the trip member to vary the length of the period of exposure will be described. It will be observed by reference to Fig. 10 of the drawings that the body 40 at that end opposite the end at which the flange 41 is formed, is provided with diametrically oppositely located lugs 59 forming extensions of the wall of the said body 40, and these lugs are designed to seat in diametrically oppositely located notches 60 formed in a ring 61 which constitutes the setting means for the trip member. This ring 61 is designed to be fitted rotatably on to the forward end of the lens tube 2 and resting flat against the forward face of the shutter front 6, the opening 62 of the ring receiving the said end of the said lens tube. A finger piece 63 extends radially from the ring 61 at a suitable point in its outer periphery and serves as a means whereby the ring may be readily angularly adjusted. It will be understood, of course, that when the ring is adjusted, the trip member 39 will be correspondingly adjusted due to the engagement of the lugs 59 in the notches 60. In order to retain the ring 61 in place as also the rotatable shutter front 6, a split locking ring 64 is snapped on to the front end of the lens tube 2 and has a beveled inner periphery 65 seating in a similarly formed channel or groove 66 extending circumferentially of the said end of the said tube. Of course, by removing the ring 64, the setting ring 61 may be readily removed as also the front 6 and the parts carried thereby, the finger 26 readily disengaging from the hooked outer end 24 of the spring 23. In order to determine the adjustment of the setting ring 61, the ring is provided upon its outer face with a number of scale marks 67 each indicated by numerals designating whole seconds or fractions of seconds, one of the marks indicated specifically by the numeral 68, being designated, however, by the letter I. A number of scale marks 69 are also provided upon the outer or forward face of the shutter front 6 and individual ones of the scale marks 67 or 68 as the case may be, are designed to be brought into registration with respective ones of the marks 69, in the angular adjustment of the setting ring 61.

Assuming that the setting ring 61 has been so adjusted that the mark 68 thereon will be in registration with the corresponding or respective one of the marks 69, the trip member 39 will have been so rotatably adjusted with relation to the detent member 48 that in the automatic actuation of the mechanism the shutter will be opened and closed as in the making of an instantaneous exposure or snapshot. In the more expensive grades of shutters means is provided whereby when the shutter mechanism is set for instantaneous exposure and the shutter is actuated either by the finger release or the bulb release devices, the period of exposure will vary in length according to the indicated shutter speed comprising a part of the said means. The shutter illustrated does not embody a shutter speed controlling means inasmuch as such means constitutes no part whatsoever of the present invention and the mechanism of the invention is designed for employment either with shutters equipped with such a means or shutters which have but one speed when actuated for instantaneous exposure. However, it is well-known that in the instance of shutters equipped with the means referred to, if the setting member of the means is adjusted to indicate a shutter speed of one-fiftieth of a second, for example, and the shutter is set for instantaneous exposure and actuated, it will, if the mechanism is accurate in its operation, remain open for the indicated period of time, and so with other indicated periods of time. Therefore, if the shutter conventionally illustrated in the drawings were equipped with speed regulating or controlling means, and the setting ring 61 also adjusted to position with the mark 68 thereon registering with the corresponding mark 69, the shutter would be opened and closed at the speed for which the said speed controlling or regulating mechanism was set. With the above understanding of the invention and the conditions stated, it will be understood by reference to Figs. 3, 4 and 7 of the drawings that initially and under normal conditions the finger 57 at the free end of the arm 56 will project into the recess 42 lying close to the inner wall 43 of the said recess. Assuming now that it is desired to make an instantaneous exposure and the setting ring 61 has been adjusted as above stated so as to adjust the trip member 39, the lug carrying end 47 of the finger 45 of the trip member will occupy a position immediately above that end of the detent ledge 53 opposite the end at which the lug 54 is located. By rotating the shutter front toward the right in Fig. 1 of the drawings, the spring 23 will be wound or placed under tension. As the said shutter front is rotated in the direction stated, the face of the flange 41 will travel past the beveled or inclined end 58 of the said finger 57, and the inclined or beveled surface 55 will sweep past the end of the said finger and press the arm 56 in the direction of the master lever 12, as clearly shown in Fig. 5 of the drawings. In the continued rotation of the shutter front, the flange 41 will continue to pass the said finger 57 until the end of the finger rides past the inclined wall 44 of the recess 42 whereupon it will occupy substantially the same position with relation to the recess 42 and the bottom wall 43 of the said recess as in its initial or normal position. However, as stated, the spring 23 has been tensioned by the rotation of the shutter front in the direction stated, and when the front is released, it will be backwardly rotated, or in other words, rotated toward the left in the said Fig. 1 under the influence of the said spring 23. In such rotation of the shutter front, the end of the finger 57 will be engaged by the inclined or curved end wall 44 of the recess 42, and the finger will be moved in an outward direction carrying with it the arm 56 of which it forms a part, and the master lever to which the arm is secured, this movement of the parts being clearly illustrated in Fig. 8 of the drawings. In this manner, therefore, the first result of the rotation of the shutter front under the influence of the spring is the swinging of the master lever to position where its lug carrying end 14 will ride over and engage behind the lug 15 upon the blade ring lever 10. As, after riding up upon the surface 44, the finger 57 will rest in engagement with the edge or periphery of the flange 41, the master lever will be maintained in the position shown in Fig. 8 of the drawings, and the shutter will remain closed until the extremity of the finger 46 passes beneath the said finger 57, whereupon the master lever 12 will be immediately swung through the influence of its spring 19 to position to trip the blade ring lever and cause actuation of the blade ring in a manner to make an instantaneous exposure. If it is desired to make an exposure which will require a period of time greater than the maximum period of time permitted through adjustment of any exposure period controlling or regulating device with which the shutter may be equipped, or should it be desired to make an exposure requiring a greater period of time than the period required for the ordinary instantaneous exposure if the shutter is a one speed shutter, the setting ring 61 is adjusted until the desired exposure is indicated by the registration of one or another of the marks 67 with the corresponding mark 69, as for example the two second mark of the group 67 with the related mark of the group 69 as illustrated in Fig. 1 of the drawings. In adjusting the ring 61 in the manner stated, the trip member 39 will be rotatably adjusted until, with the adjustment indicated in the said Fig. 1, the lug 47 will be in engagement against the abutment lug or shoulder 54 as illustrated clearly in Fig. 2 of the drawings. With the parts in this relative position, the detent ledge 53 will project beyond the extremity of the finger 45 to the fullest extent. Of course, if the setting ring 61 is adjusted to indicate an exposure of one second, the ledge 53 will not project so far beyond the extremity of the finger 45 and the extent to which the said ledge projects, will, of course, lessen with the length of the period of exposure. Assuming, however, that the parts have been adjusted as above stated, and the shutter front is rotated to set the same and then released, the parts will coact in the manner above described with the exception that when the finger 57 is permitted to drop or swing inwardly as the extremity of the finger 45 passes from beneath it, the said finger will strike the detent ledge 53 and will rest there against instead of being permitted to swing inwardly to the fullest extent. Inasmuch as the ledge 53 is so positioned that when the finger 57 is in engagement therewith, the master lever 12 will be in a position to maintain the shutter in open position, the said shutter will, of course, remain in open position until the shutter front has, through further or continued rotation, caused the extremity of the ledge 53 to pass from beneath the finger 57 whereupon the finger will be fully released and the master lever 12 will be swung inwardly to automatically close the shutter.

Having thus described the invention, what is claimed as new is:

1. In camera shutter actuating mechanism, the combination with a master member, of a trip member, means for automatically moving the said trip member, elements upon the master and trip members for coaction to trip the master member at a point in the movement of the trip member and to release the master member for actuation of the shutter at another point in the movement of the said trip member.

2. In camera shutter operating mechanism, the combination with a master lever, a shutter, and operative means between the said lever and shutter for actuating the shutter to open and close the same when the said master lever is tripped and then released, of a trip member manually movable in one direction, means for automatically moving the trip member in the opposite direction when the member has been manually moved and then released, and coacting means associated with the master lever and trip member for tripping the said master lever and releasing the same at a predetermined point in the operation of the said trip member.

3. In camera shutter operating mechanism, the combination with a master lever, a shutter, and operative means between the said lever and shutter for actuating the shutter to open and close the same when the said master lever is tripped and then released, of a trip member manually rotatable in one direction, means for automatically rotating the trip member in the opposite direction when released after having been manually moved, and coacting means associated with the master lever and trip member for tripping the said master lever and releasing the same at a predetermined point in the automatic rotation of the said trip member.

4. In camera shutter operating mechanism, the combination with a master lever, a shutter, and operative means between the said lever and shutter for actuating the shutter to open and close the same when the said master lever is tripped and then released, of a trip member manually movable in one direction, means for automatically moving the trip member in the opposite direction when manually moved and released, means for timing the movement of the trip member under the influence of the moving means, and coacting means associated with the master lever and trip member for tripping the said master lever and releasing the same at a predetermined point in the movement of the trip member in the last-mentioned direction.

5. In camera shutter operating mechanism, the combination with a master lever, a shutter, and operating means between the said lever and shutter for actuating the shutter to open and close the same when the said master lever is tripped and then released, of a trip member manually rotatable in one direction, means for automatically rotating the said member in the opposite direction when the member has been manually moved and released, a ratchet associated with the trip member, an escapement lever for coaction with the ratchet, means for retarding the oscillation of the escapement lever, and coacting means associated with the master lever and trip member for tripping the said master lever and then releasing the same at a predetermined point in the rotation of the trip member in the last-mentioned direction.

6. In camera shutter operating mechanism, the combination with a master lever, a shutter, and operating means between the said lever and shutter for actuating the shutter to open and close the same when the said master lever is tripped and then released, of a trip member manually rotatable in one direction, means for rotating the trip member in the opposite direction when the trip member has been manually rotated and then released, a ratchet associated with the said trip member, an escapement lever coacting with the ratchet, a pivoted dash pot cylinder, a piston working therein and operatively connected with the escapement lever, and coacting means associated with the master lever and trip member for tripping the said master lever and then releasing the same at a predetermined point in the rotation of the trip member in the last-mentioned direction.

7. In camera shutter operating mechanism, the combination with a master lever, a shutter, and operating means between the said lever and shutter for actuating the shutter to open and close the same when the said master lever is tripped and then released, of a trip member manually rotatable in one direction, means for rotating the trip member in the opposite direction when the trip member has been manually rotated and then released, a ratchet associated with the trip member, a floating escapement lever coacting with the ratchet, means yieldably holding the escapement lever in operative relation to the ratchet, means for retarding the oscillation of the escapement lever, and coacting means associated with the master lever and trip member for tripping the said master lever and then releasing the same at a predetermined point in the rotation of the trip member in the last-mentioned direction.

8. In camera shutter operating mechanism, the combination with a master lever, a shutter, and operating means between the said lever and shutter for actuating the shutter to open and close the same when the said master lever is tripped and then released, of a trip member manually rotatable in one direction, means for rotating the trip member in the opposite direction after the trip member has been manually rotated and then released, a ratchet associated with the trip member, a pivoted supporting member, a spring yieldably holding the supporting member rocked upon its pivot in one direction, an escapement lever pivotally mounted upon the said supporting member and in the said position of the supporting member being yieldably held in coactive relation to the ratchet, and coacting means associated with the master lever and trip member for tripping the said master lever and then releasing the same at a predetermined point in the operation of the said trip member.

9. In camera shutter operating mechanism, the combination with a master lever, a shutter, and operating means between the said lever and shutter for actuating the shutter to open and close the same when the said master lever is tripped and then released, of a trip member manually rotatable in one direction, means for rotating the trip member in the opposite direction after the trip member has been manually rotated and then released, a ratchet associated with the trip member, a pivoted supporting member, a spring yieldably holding the supporting member rocked upon its pivot in one direction, an escapement lever pivotally mounted upon the said supporting member and in the said position of the supporting member being yieldably held in coactive relation to the ratchet, means for retarding the oscillation of the escapement lever, and coacting means associated with the master lever and trip member for tripping the said master lever and then releasing the same at a predetermined point in the operation of the said trip member.

10. In camera shutter operating mechanism, the combination with a master lever, a shutter, and operating means between the said lever and shutter for actuating the shutter to open and close the same when the said master lever is tripped and then released, of a trip member manually rotatable in one direction, means for rotating the trip member in the opposite direction after the trip member has been manually rotated and then released, a ratchet associated with the trip member, a pivoted supporting member, a spring yieldably holding the supporting member rocked upon its pivot in one direction, an escapement lever pivotally mounted upon the said supporting member and in the said position of the supporting member being yieldably held in coactive relation to the ratchet, a pivoted dash pot cylinder, a piston working in the cylinder and operatively connected with the escapement lever, and coacting means associated with the master lever and trip member for tripping the said master lever and then releasing the same at a predetermined point in the operation of the said trip member.

11. In camera shutter operating mechanism, in combination, a shutter casing having a front manually rotatable in one direction, means for automatically rotating the said front of the shutter casing in the opposite direction after it has been manually rotated in the first-mentioned direction and released, a master lever housed within the casing, a shutter within the casing, means between the said master lever and shutter for actuating the shutter to open and close the same when the said master lever is tripped and then released, a trip member carried by the rotatable shutter front, and coacting means associated with the master lever and trip member for first tripping the master lever and then automatically releasing the same at a predetermined point in the rotation of the shutter front in the last-mentioned direction.

12. In camera shutter operating mechanism, in combination, a shutter casing having a front manually rotatable in one direction, means for automatically rotating the said front of the shutter casing in the opposite direction after it has been manually rotated in the first-mentioned direction and released, a master lever housed within the casing, a shutter within the casing, means between the said master lever and shutter for actuating the shutter to open and close the same when the said master lever is tripped and then released, a trip member carried by the rotatable shutter front, coacting means associated with the master lever and trip member for first tripping the master lever and then automatically releasing the same at a predetermined point in the rotation of the shutter front in the last-mentioned direction, and means for retarding the rotation of the said shutter front in the last-mentioned direction.

13. In camera shutter operating mechanism, in combination, a shutter casing having a front manually rotatable in one direction, means for automatically rotating the said front of the shutter casing in the opposite direction after it has been manually rotated in the first-mentioned direction and released, a master lever housed within the casing, a shutter within the casing, means between the said master lever and shutter for actuating the shutter to open and close the same when the said master lever is tripped and then released, a trip member carried by the rotatable shutter front, coacting means associated with the master lever and trip member for first tripping the master lever and then automatically releasing the same at a predetermined point in the rotation of the shutter front in the last-mentioned direction, a ratchet carried by the said rotatable front, and an escapement lever carried by the casing and coacting with the said ratchet to retard the rotation of the said front in the last-mentioned direction.

14. In camera shutter operating mechanism, in combination, a shutter casing having a front manually rotatable in one direction, means for automatically rotating the said front of the shutter casing in the opposite direction after it has been manually rotated in the first-mentioned direction and released, a master lever housed within the casing, a shutter within the casing, means between the said master lever and shutter for actuating the shutter to open and close the same when the said master lever is tripped and then released, a trip member carried by the rotatable shutter front, coacting means associated with the master lever and trip member for first tripping the master lever and then automatically releasing the same at a predetermined point in the rotation of the shutter front in the last-mentioned direction, a ratchet carried by the said front, an escapement lever carried by the casing and coacting with the ratchet, and means associated with the escapement lever for retarding the oscillation thereof.

15. In camera shutter operating mechanism, in combination, a shutter casing having a front manually rotatable in one direction, means for automatically rotating the said front of the shutter casing in the opposite direction after it has been manually rotated in the first-mentioned direction and released, a master lever housed within the casing, a shutter within the casing, means between the said master lever and shutter for actuating the shutter to open and close the same when the said master lever is tripped and then released, a trip member carried by the rotatable shutter front, coacting means associated with the master lever and trip member for first tripping the master lever and then automatically releasing the same at a predetermined point in the rotation of the shutter front in the last-mentioned direction, a ratchet carried by the said front, an escapement lever carried by the said casing and coacting with the ratchet, a dash pot cylinder carried by the casing, and a piston reciprocating in said cylinder and having operative connection with the said escapement lever.

16. In camera shutter operating mechanism, in combination, a shutter casing having a front manually rotatable in one direction, means for automatically rotating the said front of the shutter casing in the opposite direction after it has been manually rotated in the first-mentioned direction and released, a master lever housed within the casing, a shutter within the casing, means between the said master lever and shutter for actuating the shutter to open and close the same when the said master lever is tripped and then released, a trip member carried by the rotatable shutter front, coacting means associated with the master lever and trip member for first tripping the master lever and then automatically releasing the same at a predetermined point in the rotation of the shutter front in the last-mentioned direction, a ratchet carried by the said front, and an escapement lever having a floating supporting pivot, the said escapement lever coacting with the said ratchet.

17. In camera shutter operating mechanism, in combination, a shutter casing having a front manually rotatable in one direction, means for automatically rotating the said front of the shutter casing in the opposite direction after it has been manually rotated in the first-mentioned direction and released, a master lever housed within the casing, a shutter within the casing, means between the said master lever and shutter for actuating the shutter to open and close the same when the said master lever is tripped and then released, a trip member carried by the rotatable shutter front, coacting means associated with the master lever and trip member for first tripping the master lever and then automatically releasing the same at a predetermined point in the rotation of the shutter front in the last-mentioned direction, a ratchet carried by the said front, a supporting member pivotally mounted within the casing, means yieldably holding the member swung upon its pivot in one direction, and an escapement lever pivotally mounted upon the said supporting member and coacting with the said ratchet.

18. In camera shutter operating mechanism, in combination, a shutter casing having a front manually rotatable in one direction, means for automatically rotating the said front of the shutter casing in the opposite direction after it has been manually rotated in the first-mentioned direction and released, a master lever housed within the casing, a shutter within the casing, means between the said master lever and shutter for actuating the shutter to open and close the same when the said master lever is tripped and then released, a trip member carried by the rotatable shutter front, coacting means associated with the master lever and trip member for first tripping the master lever and then automatically releasing the same at a predetermined point in the rotation of the shutter front in the last-mentioned direction, a ratchet carried by the said front, a supporting member movably mounted within the casing, an escapement lever pivotally mounted upon the supporting member and coacting with the ratchet, and means coacting with the member to yieldably hold the same in position with the escapement lever in coaction with the ratchet.

19. In camera shutter operating mechanism, in combination, a shutter casing having a front manually rotatable in one direction, means for automatically rotating the said front of the shutter casing in the opposite direction after it has been manually rotated in the first-mentioned direction and released, a master lever housed within the casing, a shutter within the casing, means between the said master lever and shutter for actuating the shutter to open and close the same when the said master lever is tripped and then released, a trip member carried by the rotatable shutter front, coacting means associated with the master lever and trip member for first tripping the master lever and then automatically releasing the same at a predetermined point in the rotation of the shutter front in the last-mentioned direction, a ratchet carried by the front, a supporting member movably mounted within the casing, an escapement lever pivotally mounted upon the said lever, means yieldably holding the member moved in the direction of the ratchet, and means for retarding the oscillatory motion of the escapement lever.

20. In camera shutter operating mechanism, in combination, a shutter casing having a front manually rotatable in one direction, a spring connected at its inner end with a portion of the said front, a stop element carried by the front and engageable by the outer end of the spring, a fixed element carried by the casing and engaging the said outer end of the spring and arranged to hold the same stationary when the said front is manually rotated, the said spring constituting means for rotating the front in the opposite direction after it has been manually rotated in the first-mentioned direction and released, a master lever housed within the casing, a shutter within the casing, means between the said master lever and shutter for actuating the shutter to open and close the same when the said master lever is tripped and then released, a trip carried by the rotatable shutter front, and a coacting means associated with the master lever and trip member for first tripping the master lever and then automatically releasing the same at a predetermined point in the rotation of the shutter front in the last-mentioned direction.

21. In camera shutter operating mechanism, in combination, a shutter casing having a front manually rotatable in one direction, a spring carried by the front and connected at one end therewith, a stop element rotatable with the said shutter front, a fixed element carried by the shutter casing and located in the path of movement of the said stop element, the other end of the spring being connected to the said fixed element and the spring constituting means for automatically rotating the said front of the shutter casing in the opposite direction after it has been manually rotated in the first-mentioned direction and released, a master lever housed within the casing, a shutter within the casing, means between the said master lever and shutter for actuating the shutter to open and close the same when the said master lever is tripped and then released, a trip member carried by the rotatable shutter front, and coacting means associated with the master lever and trip member for first tripping the master lever and then automatically releasing the same at a predetermined point in the rotation of the shutter front in the last-mentioned direction.

22. In camera shutter operating mechanism, in combination, a shutter, a master lever, means between the said master lever and shutter for actuating the shutter to open and close the same when the said master lever is tripped and then released, a trip member movable with relation to the said master lever, means for moving the said trip member, coacting means upon the said master lever and trip member for first tripping the said lever and then releasing the same at a predetermined point in the movement of the said trip member, and means for temporarily arresting the release movement of the master lever to determine the length of the exposure period.

23. In camera shutter operating mechanism, in combination, a shutter, a master lever, means between the said master lever and shutter for actuating the shutter to open and close the same when the said master lever is tripped and then released, a trip member movable with relation to the said master lever, means for moving the said trip member, coacting means upon the said master lever and trip member for first tripping the said lever and then releasing the same at a predetermined point in the movement of the said trip member, and means movable with the trip member and positioned with relation thereto to come into the path of release movement of the master lever after the master lever has been released by the said trip member, whereby to determine the length of the exposure period.

24. In camera shutter operating mechanism, in combination, a shutter, a master lever, means between the said master lever and shutter for actuating the shutter to open and close the same when the said master lever is tripped and then released, a trip member movable with relation to the said master lever, means for moving the said trip member, coacting means upon the said master lever and trip member for first tripping the said lever and then releasing the same at a predetermined point in the movement of the said trip member, and means for arresting the master lever in its release movement at an intermediate point in said movement, at which point the said means between the master lever and shutter will hold the shutter in open position, whereby to determine the length of the exposure period.

25. In camera shutter operating mechanism, in combination, a shutter, a master lever, means between the said master lever and shutter for actuating the shutter to open and close the same when the said master lever is tripped and then released, a trip member movable with relation to the said master lever, means for moving the said trip member, coacting means upon the said master lever and trip member for first tripping the said lever and then releasing the same at a predetermined point in the movement of the said trip member, and a detent member movable with the trip member and active subsequent to release of the master lever by the trip member, to arrest the movement of the master lever at an intermediate point in its said release movement and to finally fully release the said master lever.

26. In camera shutter operating mechanism, in combination, a shutter, a master lever, means between the said master lever and shutter operating, when the master lever is tripped and released, to open the shutter at an intermediate point in the release movement of the master lever and close the said shutter in the latter part of the said release movement of the master lever, a trip member movable with relation to the said master lever, means for moving the said trip member, coacting means upon the said master lever and trip member for first tripping the said lever and then releasing the same at a predetermined point in the movement of the said trip member, and means movable with the trip member for temporarily arresting the master lever at an intermediate point in its release movement to determine the length of the exposure period and then fully releasing the said lever.

27. In camera shutter operating mechanism, in combination, a shutter, a master lever, means between the said master lever and shutter operating, when the master lever is tripped and released, to open the shutter at an intermediate point in the release movement of the master lever and close the said shutter in the latter part of the said release movement of the master lever, a trip member movable with relation to the said master lever, means for moving the said trip member, coacting means upon the said master lever and trip member for first tripping the said lever and then releasing the same at a predetermined point in the movement of the said trip member, and means movable with the trip member for temporarily arresting the master lever at an intermediate point in its release movement to determine the length of the exposure period and then fully releasing the said lever, the trip member being adjustable with relation to the last-mentioned means whereby to vary the length of the period of detention of the master lever by the said means.

28. In camera shutter operating mechanism, in combination, a shutter, a master lever, means between the said master lever and shutter for actuating the shutter to open and close the same when the said master lever is tripped and then released, and a trip member movable with relation to the said master lever, means for moving the said trip member, the said master lever having a projecting element and the trip member having an effective portion traveling in the path of the said projecting element and arranged in the movement of the trip member, to engage the element and act against the same to trip the said master lever, the said effective portion having a terminal movement of which past the projecting element of the master lever results in release of the said master lever.

29. In camera shutter operating mechanism, in combination, a shutter, a master lever, means between the said master lever and shutter for actuating the shutter to open and close the same when the said master lever is tripped and then released, a trip member movable with relation to the said master lever, means for moving the said trip member, the said master lever having a projecting element and the trip member having an effective portion traveling in the path of the said projecting element and arranged in the movement of the trip member, to engage the element and act against the same to trip the said master lever, the said effective portion having a terminal movement of which past the projecting element of the master lever results in release of the said master lever, and detent means extending beyond the said terminal for temporarily arresting the release movement of the master lever whereby to determine the length of the exposure period.

30. In camera shutter operating mechanism, in combination, a shutter, a master lever, means between the said master lever and shutter for actuating the shutter to open and close the same when the said master lever is tripped and then released, a trip member movable with relation to the said master lever, means for moving the said trip member, the said master lever having a projecting element and the trip member having an effective portion traveling in the path of the said projecting element and arranged in the movement of the trip member, to engage the element and act against the same to trip the said master lever, the said effective portion having a terminal, movement of which past the projecting element of the master lever results in release of the said master lever, and a detent member movable with the trip member and extending beyond the said terminal and constituting a stepped continuation of the effective portion of the trip member and located in the path of the said projecting element upon the master lever in the release movement of the said master lever whereby to arrest the movement of the said lever at an intermediate point to determine the length of the exposure period.

31. In camera shutter operating mechanism, in combination, a shutter, a master lever, means between the said master lever and shutter for actuating the shutter to open and close the same when the said master lever is tripped and then released, a trip member movable with relation to the said master lever, means for moving the said trip member, the said master lever having a projecting element and the trip member having an effective portion traveling in the path of the said projecting element and arranged in the movement of the trip member, to engage the element and act against the same to trip the said master lever, the said effective portion having a terminal, movement of which past the projecting element of the master lever results in release of the said master lever, and a detent member movable with the trip member and extending beyond the said terminal and constituting a stepped continuation of the effective portion of the trip member and located in the path of the said projecting element upon the master lever in the release movement of the said master lever whereby to arrest the movement of the said lever at an intermediate point to determine the length of the exposure period, the said detent also having a terminal portion, movement of which past the said projecting element permits further release movement of the master lever.

32. In camera shutter operating mechanism, in combination, a shutter, a master lever, means between the said master lever and shutter for actuating the shutter to open and close the same when the said master lever is tripped and then released, a trip member movable with relation to the said master lever, means for moving the said trip member, the said master lever having a projecting element and the trip member having an effective portion traveling in the path of the said projecting element and arranged in the movement of the trip member, to engage the element and act against the same to trip the said master lever, the said effective portion having a terminal, movement of which past the projecting element of the master lever results in release of the said master lever, and a detent member movable with the trip member and extending beyond the said terminal and constituting a stepped continuation of the effective portion of the trip member and located in the path of the said projecting element upon the release movement of the master lever in the release movement of the said master lever whereby to arrest the movement of the said lever at an intermediate point to determine the length of the exposure period, the said detent also having a terminal portion, movement of which past the said projecting element permits further release movement of the master lever, the trip and detent members being relatively adjustable whereby to vary the effective length of the said detent member to provide for variation in the length of the exposure period.

33. In camera shutter operating mechanism, in combination, a shutter casing having a front manually rotatable in one direction, means for automatically rotating the said front of the shutter casing in the opposite direction after it has been manually rotated in the first-mentioned direction and then released, a master lever, a shutter, and means between the said master lever and shutter operating when the lever has been tripped and then released to open the shutter at an intermediate point in the release movement of the said lever and to close the same upon movement of the said master lever beyond said intermediate point, a trip lever carried by the rotatable shutter front, and coacting means upon the said master lever and trip member for first tripping the said lever and then releasing the same at a predetermined point in the movement of the said trip member.

34. In camera shutter operating mechanism, in combination, a shutter casing having a front manually rotatable in one direction, means for automatically rotating the said front of the shutter casing in the opposite direction after it has been manually rotated in the first-mentioned direction and then released, a master lever, a shutter, and means between the said master lever and shutter operating when the lever has been tripped and then released to open the shutter at an intermediate point in the release movement of the said lever and to close the same upon movement of the said master lever beyond said intermediate point, a trip lever carried by the rotatable shutter front, coacting means upon the said master lever and trip member for first tripping the said lever and then releasing the same at a predetermined point in the movement of the said trip member, and means for temporarily arresting the release movement of the master lever at the said intermediate point in said movement and finally releasing the said lever for completion of its said release movement.

35. In camera shutter operating mechanism, in combination, a shutter casing having a front manually rotatable in one direction, means for automatically rotating the said front of the shutter casing in the opposite direction after it has been manually rotated in the first-mentioned direction and then released, a master lever, a shutter, means between the said master lever and shutter operating when the lever has been tripped and then released to open the shutter at an intermediate point in the release movement of the said lever and to close the same upon movement of the said master lever beyond said intermediate point, a trip member carried by the rotatable shutter front, the master lever having a projecting element, the said trip member having an effective portion arranged to travel in the path of the said projecting element in the rotation of the shutter front and at one point in its travel coacting with the said projecting element to trip the said master lever, the said effective portion having a terminal the movement of which past the said projecting element serves to release the said master lever, and means movable with the trip member and extending beyond the said terminal and located in the path of movement of the said projecting element upon the master lever in the release movement of the said master lever for arresting such movement at the said intermediate point, and finally fully releasing the said lever.

36. In camera shutter operating mechanism, in combination, a shutter casing having a front manually rotatable in one direction, means for automatically rotating the said front of the shutter casing in the opposite direction after it has been manually rotated in the first-mentioned direction and then released, a master lever, a shutter, means between the said master lever and shutter operating when the lever has been tripped and then released to open the shutter at an intermediate point in the release movement of the said lever and to close the same upon movement of the said master lever beyond said intermediate point, a trip member carried by the rotatable shutter front, the master lever having a projecting element, the said trip member having an effective portion arranged to travel in the path of the said projecting element in the rotation of the shutter front and at one point in its travel coacting with the said projecting element to trip the said master lever, the said effective portion having a terminal the movement of which past the said projecting element serves to release the said master lever, and a detent element movable with the said trip member and arranged in stepped relation to the effective portion of the trip member and extending beyond the said terminal thereof whereby to be engaged by the projecting element upon the master lever in the release movement of the said lever to arrest the lever at the said intermediate point in the movement thereof, movement of the said detent element past the projecting element upon the master lever serving to release the lever for continued release movement.

37. In camera shutter operating mechanism, in combination, a shutter casing having a front manually rotatable in one direction, means for automatically rotating the said front of the shutter casing in the opposite direction after it has been manually rotated in the first-mentioned direction and then released, a master lever, a shutter, means between the said master lever and shutter operating when the lever has been tripped and then released to open the shutter at an intermediate point in the release movement of the said lever and to close the same upon movement of the said master lever beyond said intermediate point, a trip member carried by the rotatable shutter front, the master lever having a projecting element, the said trip member having an effective portion arranged to travel in the path of the said projecting element in the rotation of the shutter front and at one point in its travel coacting with the said projecting element to trip the said master lever, the said effective portion having a terminal the movement of which past the said projecting element serves to release the said master lever, and a detent element movable with the said trip member and arranged in stepped relation to the effective portion of the trip member and extending beyond the said terminal thereof whereby to be engaged by the projecting element upon the master lever in the release movement of the said lever to arrest the lever at the said intermediate point in the movement thereof, movement of the said detent element past the projecting element upon the master lever serving to release the lever for continued release movement, the trip member and the detent element being relatively adjustable whereby to vary the effective length of the said detent element and thereby vary the length of the exposure period.

38. In camera shutter operating mechanism, in combination, a shutter casing having a front manually rotatable in one direction, means for automatically rotating the said front of the shutter casing in the opposite direction after it has been manually rotated in the first-mentioned direction and then released, a master lever, a shutter, means between the said master lever and shutter operating when the lever has been tripped and then released to open the shutter at an intermediate point in the release movement of the said lever and to close the same upon movement of the said master lever beyond said intermediate point, a trip member carried by the rotatable shutter front, the master lever having a projecting element, the said trip member having an effective portion arranged to travel in the path of the said projecting element in the rotation of the shutter front and at one point in its travel coacting with the said projecting element to trip the said master lever, the said effective portion having a terminal the movement of which past the said projecting element serves to release the said master lever, and a detent element movable with the said trip member and arranged in stepped relation to the effective portion of the trip member and extending beyond the said terminal thereof whereby to be engaged by the projecting element upon the master lever in the release movement of the said lever to arrest the lever at the said intermediate point in the movement thereof, movement of the said detent element past the projecting element upon the master lever serving to release the lever for continued release movement, the trip member and the detent element being relatively adjustable whereby to vary the effective length of the said detent element and thereby vary the length of the exposure period, the shutter front having indicating marks thereon, and an adjusting member operatively connected with the trip member and in its movement serving to adjust the trip member with relation to the detent element, the said adjusting member having indicating marks for registration with the marks upon the shutter front and indicating the lengths of exposure periods.

In testimony whereof I affix my signature.

JOHN H. KLENCK. [L. S.]